(12) United States Patent
Mishra et al.

(10) Patent No.: US 11,011,322 B2
(45) Date of Patent: May 18, 2021

(54) GRAPHENE ALIGNMENT IN SOLID POLYMER ELECTROLYTE

(71) Applicant: THE BOARD OF REGENTS FOR OKLAHOMA STATE UNIVERSITY, Stillwater, OK (US)

(72) Inventors: Kunal Mishra, Tulsa, OK (US); Raman P. Singh, Tulsa, OK (US)

(73) Assignee: The Board of Regents for Oklahoma State University, Stillwater, OK (US)

(*) Notice: Subject to any disclaimer, the term of this patent is extended or adjusted under 35 U.S.C. 154(b) by 82 days.

(21) Appl. No.: 16/394,934

(22) Filed: Apr. 25, 2019

(65) Prior Publication Data
US 2019/0333713 A1    Oct. 31, 2019

Related U.S. Application Data

(60) Provisional application No. 62/663,825, filed on Apr. 27, 2018.

(51) Int. Cl.
| | |
|---|---|
| *H01G 11/56* | (2013.01) |
| *C08L 63/00* | (2006.01) |
| *H01G 11/48* | (2013.01) |
| *H01G 11/36* | (2013.01) |
| *H01G 11/40* | (2013.01) |
| *H01G 11/26* | (2013.01) |
| *H01G 11/38* | (2013.01) |

(52) U.S. Cl.
CPC ............. *H01G 11/56* (2013.01); *C08L 63/00* (2013.01); *H01G 11/26* (2013.01); *H01G 11/36* (2013.01); *H01G 11/40* (2013.01); *H01G 11/48* (2013.01); *C08K 2201/001* (2013.01); *H01G 11/38* (2013.01)

(58) Field of Classification Search
CPC ........................................................ H01G 11/56
See application file for complete search history.

(56) References Cited

U.S. PATENT DOCUMENTS

| 6,645,675 B1 | 11/2003 | Munshi |
| 9,680,181 B2 | 6/2017 | Rhee et al. |
| 2010/0068461 A1* | 3/2010 | Wallace ............. B81C 1/00111 |
| | | 428/156 |

(Continued)

OTHER PUBLICATIONS

Zhang et al.; Preparation of vertically aligned carbon nanotube/polyaniline composite membranes and the flash welding effect on their supercapacitor properties; 2016; Royal Society of Chemistry; 6, pp. 98598-98605 (Year: 2016).*

(Continued)

*Primary Examiner* — Eric W Thomas
(74) *Attorney, Agent, or Firm* — McAfee & Taft

(57) ABSTRACT

Solid polymer electrolyte (SPE) having conductive filler aligned to have directional ionic conductivity. The SPE with aligned conductive filler are used in a structural supercapacitor comprising one or more plies. Each of the plies has a first and second conducting member, each with a plurality of sections with conductive filler oriented normal to the inner surface of the first conducting member. The plies also having a pair of epoxy-SPE layers with aligned conductive filler. The resin layers are between the inner surfaces of the first and second conducting members.

18 Claims, 6 Drawing Sheets

(56) References Cited

U.S. PATENT DOCUMENTS

2011/0164349 A1* 7/2011 Snyder .................. H01G 11/84
  361/525
2018/0137987 A1* 5/2018 Vilc ...................... H01G 9/025

OTHER PUBLICATIONS

Qiong Wu, et al., Supercapacitors Based on Flexible Graphene/Polyaniline Nanofiber Composite Films, American Chemical Society, Mar. 31, 2010, vol. 4, No. 4, pp. 1963-1970.

* cited by examiner

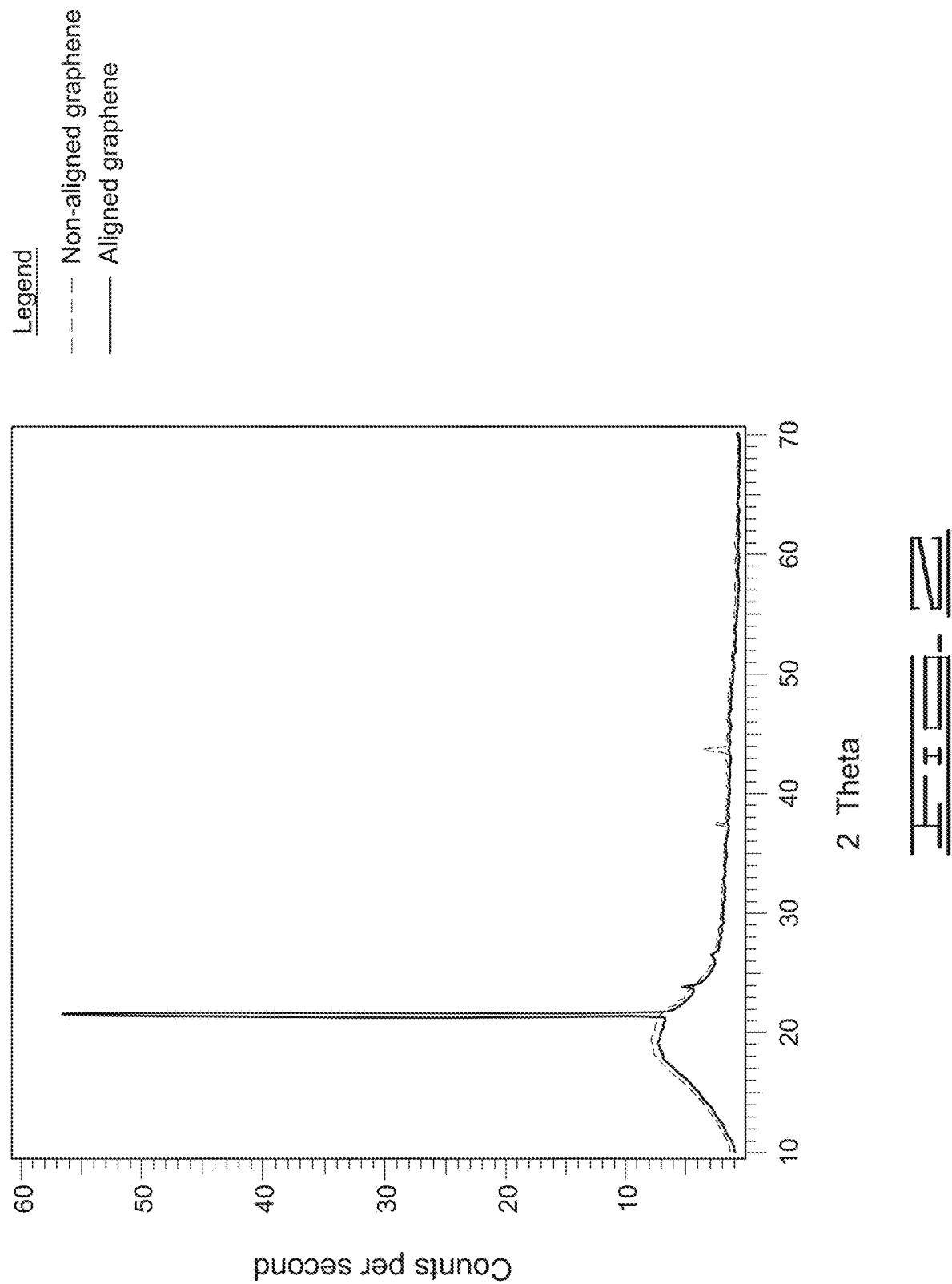

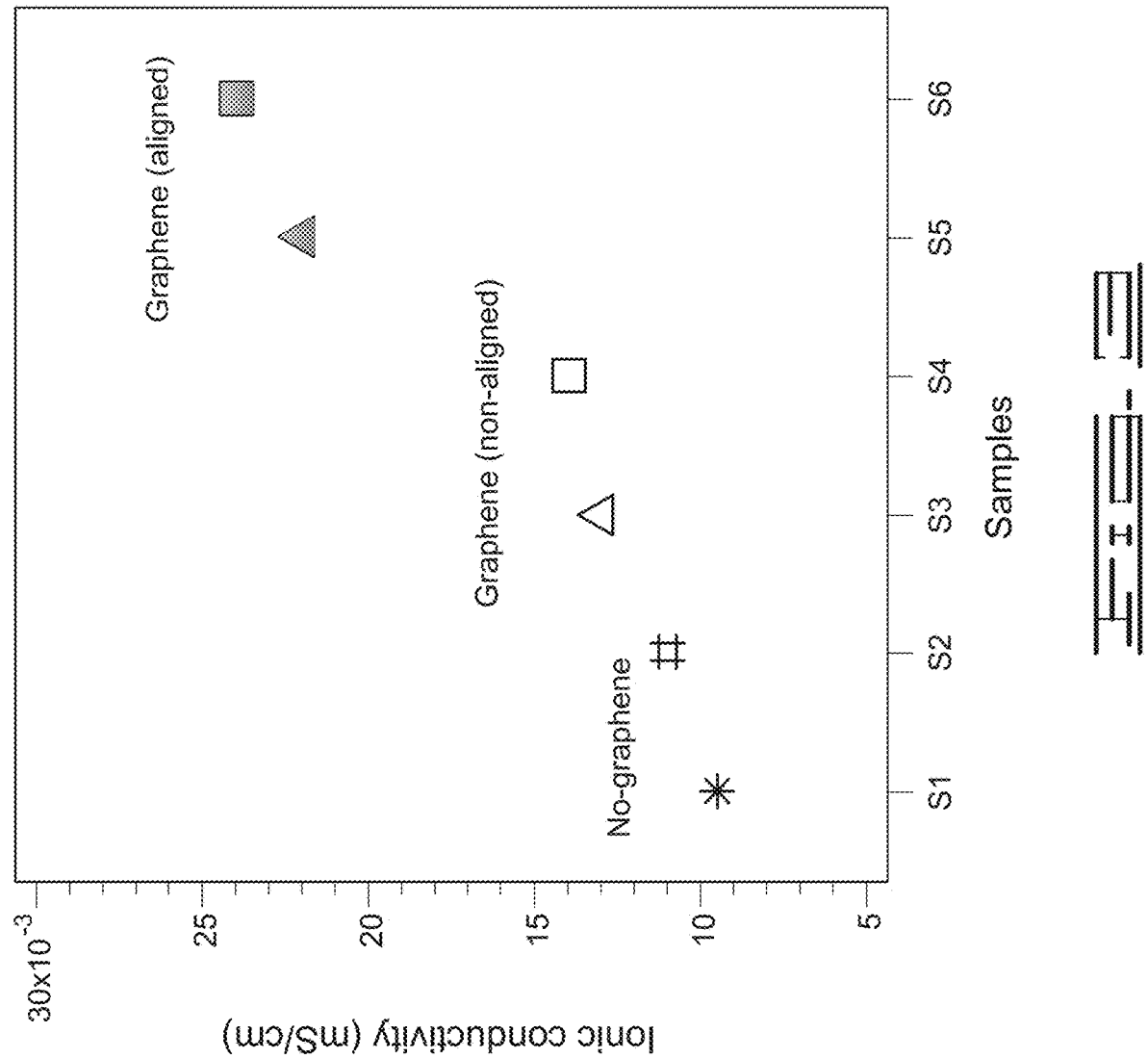

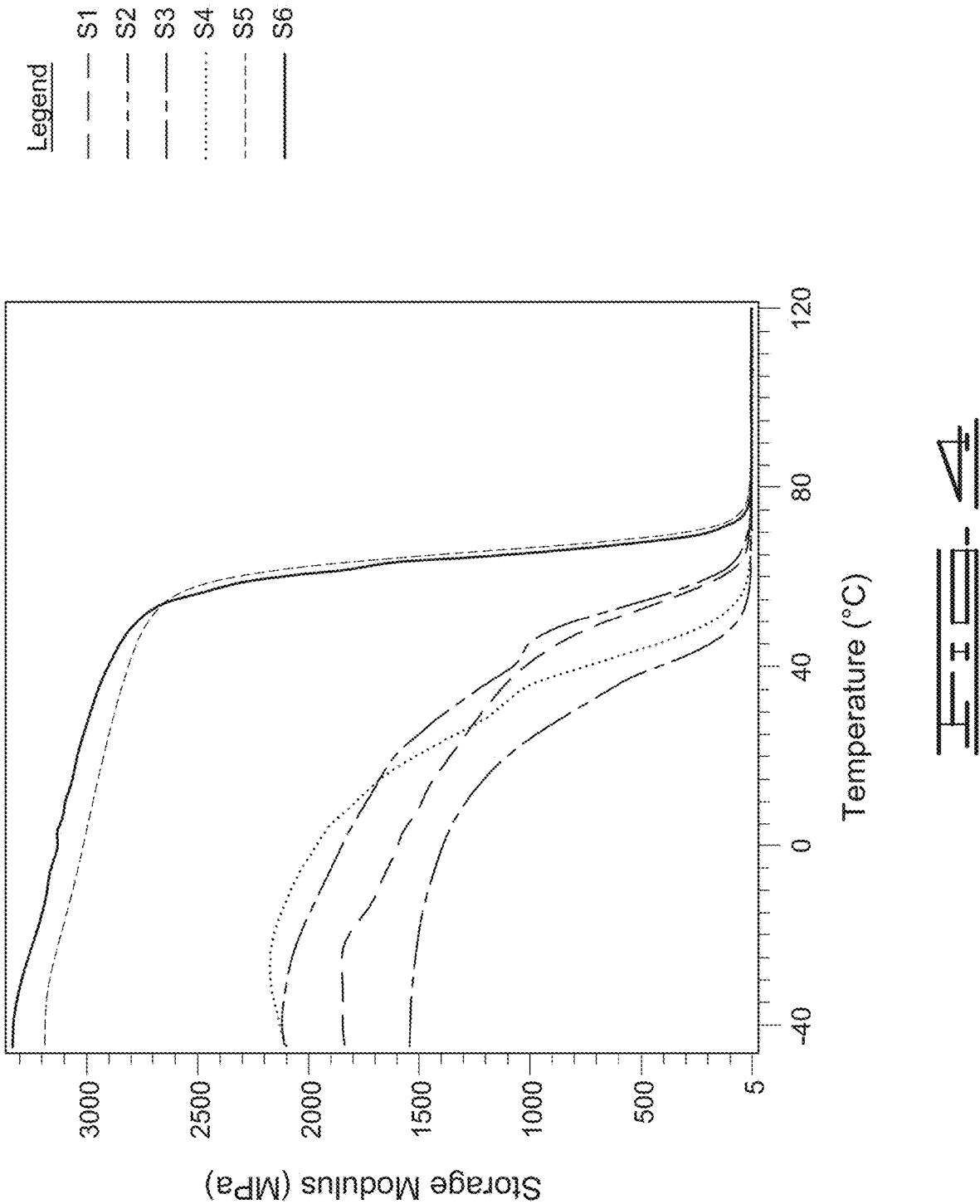

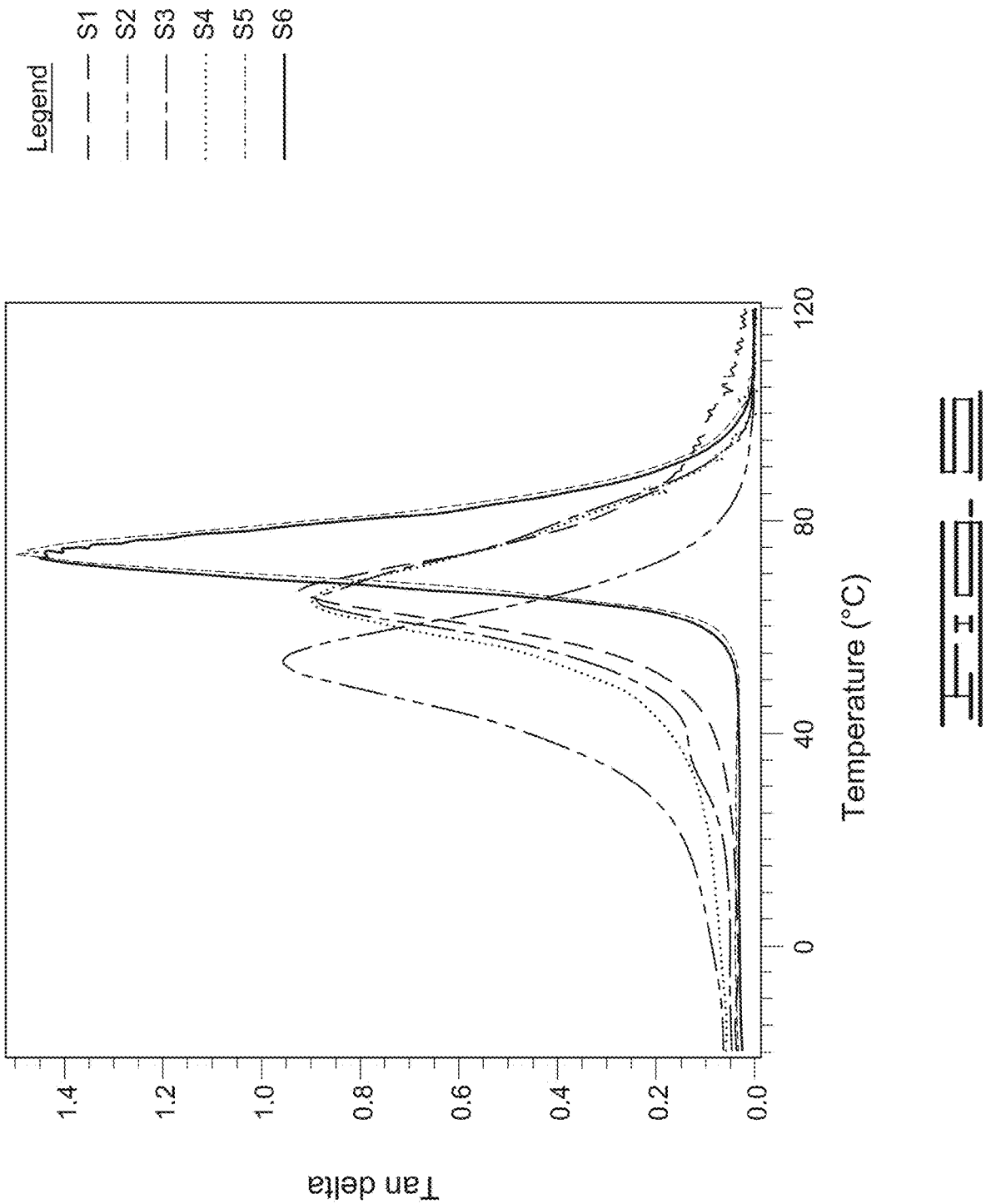

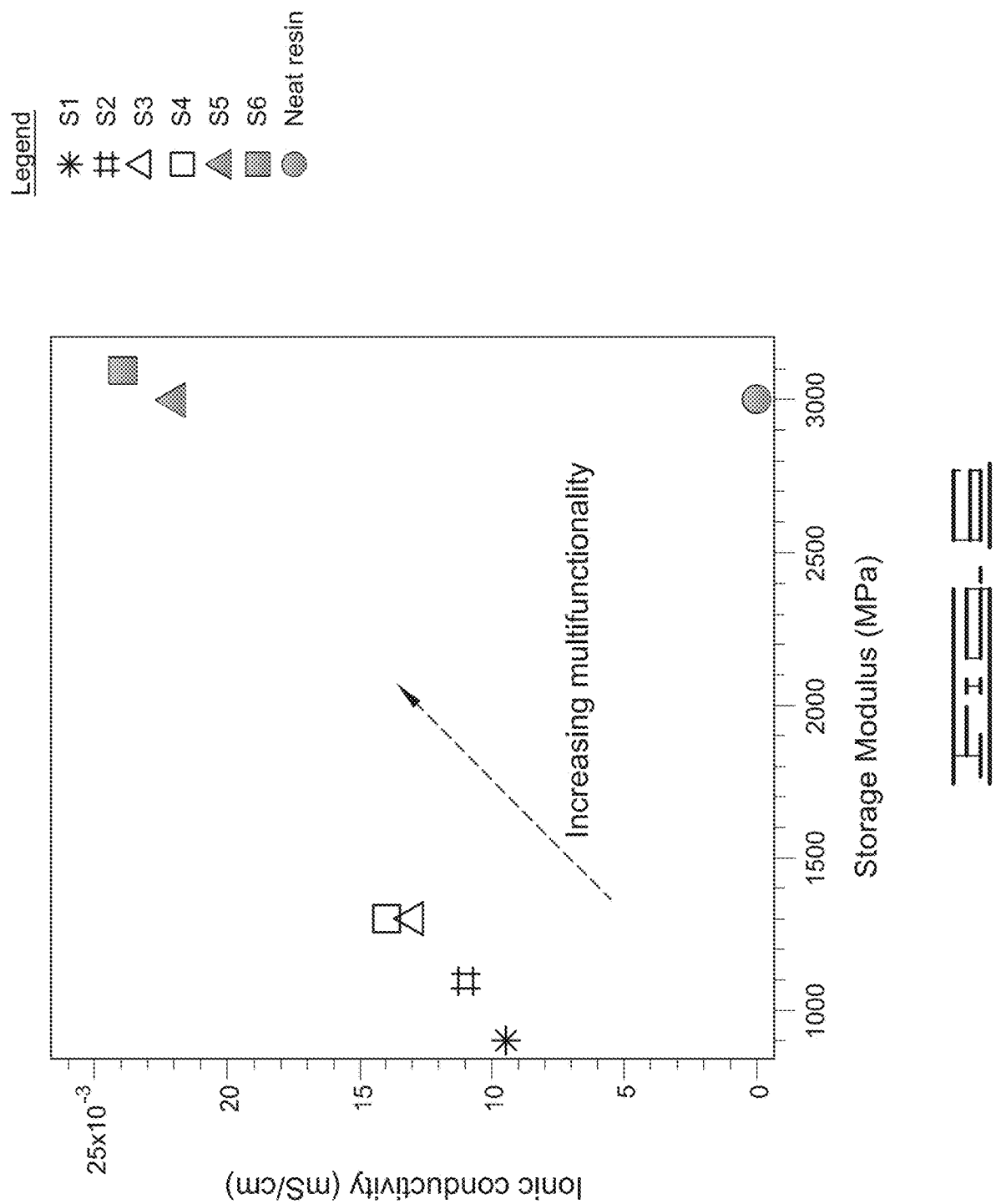

GRAPHENE ALIGNMENT IN SOLID POLYMER ELECTROLYTE

CROSS-REFERENCE TO RELATED APPLICATION

This application claims the benefit of U.S. Provisional Application No. 62/663,825 filed Apr. 27, 2018, which is hereby incorporated by reference.

FIELD

This disclosure generally relates to structural polymer systems, and more particularly, to structural polymer systems that also provide electronic or ionic conductivity.

BACKGROUND

Continued depletion of fossil fuel reserves and concerns with global warming have escalated efforts to find alternative resources to satisfy the various needs of energy management. Batteries and supercapacitors have been recognized as an option in many industries for cleaner energy management. The push for their use in automobiles has gained momentum with the expansion of the electric vehicle (EV) industry. However, the development of next-generation electric vehicles is subject to numerous challenges including the need to go beyond the currently typical 250-mile range, faster re-charging, and greater speeds. In current electric vehicles, the weight of battery can be as much as 35% of the total. Hence, adding battery capacity to increase the travel range leads to a significant weight penalty resulting in reduced efficiency.

One way to address this challenge is by introducing multifunctional materials that can serve as both energy storage and load-bearing materials. If this can be done efficiently, then energy storage can be added to automotive structures without introducing parasitic weight. Researchers have recently explored manufacturing processes to transform composites into multifunctional structures. Major automobile manufacturers have started investigating a multifunctional composite concept where they embed a lithium-ion battery within a composite laminate.

Multifunctional materials are also needed for aerospace applications. Electric-propulsion-based aerospace vehicles represent the next generation of commercial air transport. These futuristic vehicles are a key component of NASA's ongoing mission to transition from gas turbine driven engines to electric propulsion engines and hold the promise for greatly enhanced efficiency, reduced energy consumption, low pollution, and decreased noise. The most significant technological barrier to the development of these aero-vehicles is the need for distributed electrical energy storage systems. This is something that could be addressed by developing multifunctional carbon-fiber composites that serve as batteries or supercapacitors while simultaneously providing structural support. Since organic polymers are non-conducting, the addition of ionic liquids and cationic salts has been explored to develop solid polymer electrolytes (SPE) for use in carbon-fiber composites. Unfortunately, the ionic conductivity of these SPEs is inversely correlated with their mechanical properties. Therefore, these SPEs are poorly suited to serve as the matrix material in polymeric composites for structural applications.

Accordingly, there is a need to develop structural polymers that overcome the reduction of mechanical properties due to the addition of ionic liquids and cationic salts in the structural polymer

SUMMARY

Consistent with the present disclosure, a solid polymer electrolyte having conductive filler—for example graphene nano-platelets, carbon nanotubes, carbon nanofibers, and similar, aligned to have directional ionic conductivity is provided. The SPE comprises a base polymer and a metal salt. Typically, the base polymer and metal salt are combined with an epoxy resin to produce an SPE-epoxy resin having aligned conductive filler. For example, the base polymer can be a polyethylene glycol, the metal salt can be a salt of lithium, and the epoxy resin is an amine-cured epoxy resin.

The above composition can be made by a process comprising:
  introducing conductive filler and epoxy resin into a liquid comprising a base polymer and metal salt so as to produce a mixture;
  applying a voltage to the mixture so as to align the conductive filler within the mixture;
  curing the epoxy resin so that the mixture produces an epoxy solid-polymer electrolyte having conductive filler aligned to have directional ionic conductivity.

The above composition can be used to produce a structural supercapacitor having one or more plies. Each of the plies comprises a first conducting member, a second conducting member, a pair of epoxy-SPE layers, and an insulating mat.

The first conducting member has a first inner surface. The first inner surface has a first plurality of sections with each section having planar aligned conductive filler oriented normal to the first inner surface of the first conducting member.

The second conducting member has a second inner surface. The second inner surface has a first plurality of sections, with each section having planar aligned conductive filler oriented normal to the second inner surface of the second conducting member.

The pair of epoxy-SPE layers have conductive filler as described above and are between the first inner surface of the first member and the second conducting member. The insulating mat is positioned between the epoxy-SPE layers.

In the embodiments, the first conducting member and second conducting member can comprise one or more of carbon fiber, metallic wires or metallic meshes. Further, the first plurality of sections of the first inner surface typically alternate with a second plurality of sections of the first inner surface, wherein the second plurality of sections does not have conductive filler. Similarly, the first plurality of sections of the second inner surface typically alternate with a second plurality of sections of the second inner surface, wherein the second plurality of sections does not have conductive filler.

BRIEF DESCRIPTION OF THE DRAWINGS

The description and embodiments are discussed with reference to the following figures. However, the figures should not be viewed as exclusive embodiments. The subject matter disclosed herein is capable of considerable modifications, alterations, combinations, and equivalents in form and function, as will be evident to those skilled in the art with the benefit of this disclosure.

FIG. 2 is a graph of the X-ray diffraction for samples of non-aligned graphene in SPE-epoxy and aligned graphene in SPE-epoxy.

FIG. 3 is a graph of the ionic conductivity for samples containing no graphene, non-aligned graphene and aligned graphene.

FIG. 4 is a graph illustrating the storage modulus for samples containing no graphene, non-aligned graphene and aligned graphene.

FIG. 5 is a graph illustrating the glass transition temperature of samples containing no graphene, non-aligned graphene and aligned graphene.

FIG. 6 is a graph illustrating ionic conductivity and mechanical properties of a neat epoxy resin compared with the samples containing etheric-oxygen polyethylene glycol with lithium triffluormethane sulfonate (PEG/LiTf) and no graphene, non-aligned graphene and aligned graphene.

DETAILED DESCRIPTION

Figure 1:
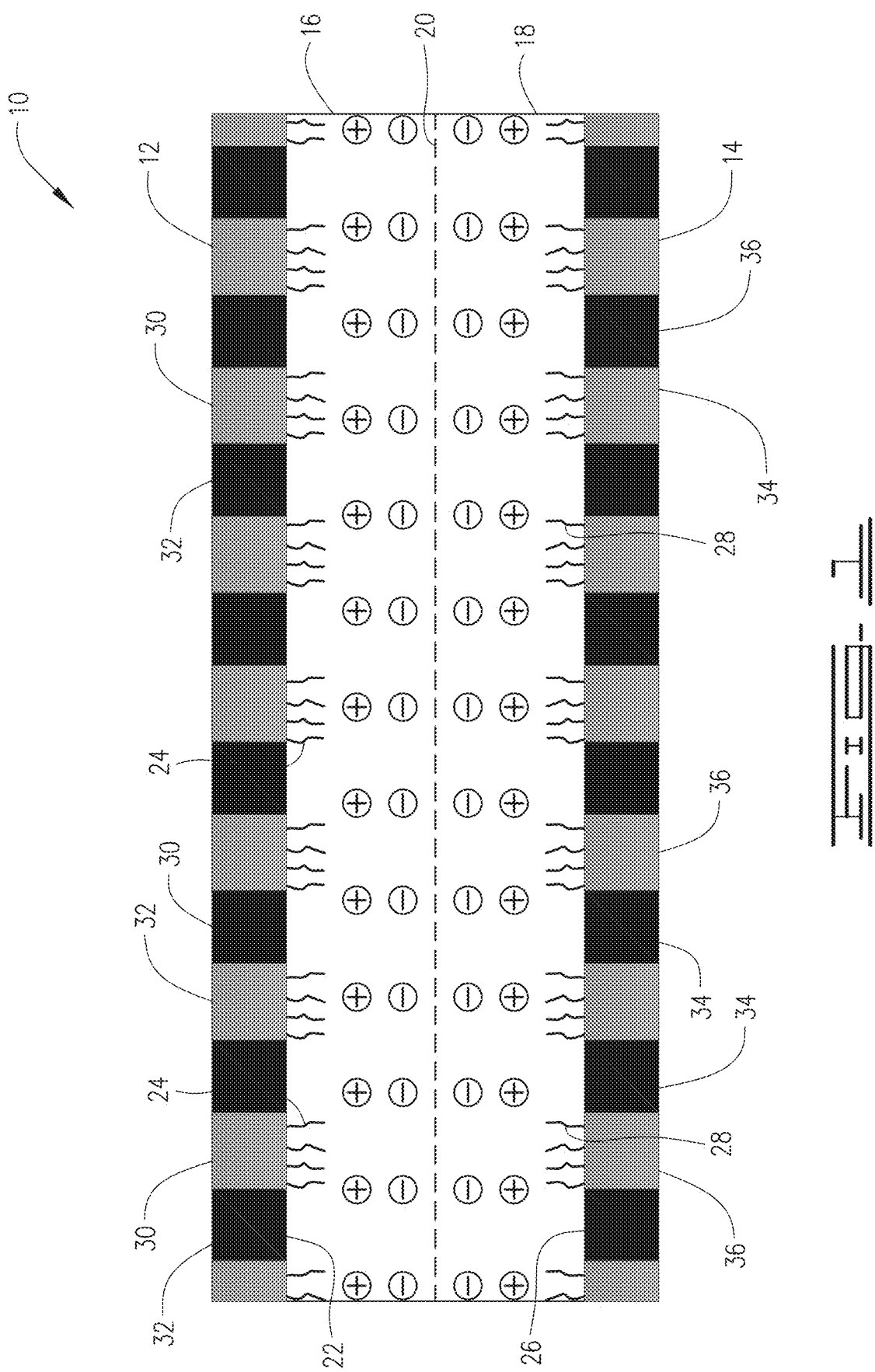
FIG. 1 is a schematic illustration of a structural supercapacitor designed in accordance with this description.

The present disclosure may be understood more readily by reference to this detailed description as well as to the examples included herein. Numerous specific details are set forth in order to provide a thorough understanding of the embodiments and examples described herein. However, it will be understood by those of ordinary skill in the art that the embodiments and examples described herein can be practiced without these specific details. In other instances, methods, procedures and components have not been described in detail so as not to obscure the related relevant feature being described. Also, the description is not to be considered as limiting the scope of the embodiments described herein.

The current disclosure is directed to overcoming the reduction of mechanical properties due to the addition of ionic liquids and cationic salts in a structural polymer. Embodiments include introducing a stiffer filler, such as graphene, that can also provide electronic or ionic conductivity—generally referred to herein as "conductive filler". These embodiments can include the alignment of the conductive filler. The embodiments provide for effective solid polymer electrolytes (SPEs) without compromising the mechanical properties.

The basis of the current embodiments is a composition comprising a solid polymer electrolyte (SPE), and conductive filler aligned to have directional ionic conductivity. In the embodiments, the SPE and aligned conductive filler can be diffused through an epoxy resin.

In accordance with known technology, the SPE comprises a base polymer and a metal salt. For example, the base polymer can be a polyethylene glycol, and the salt can be a salt of lithium. Improvement over such prior technology comes from aligning the conductive filler within the SPE.

As indicated above, the conductive filler is a stiffer filler that can also provide both structural enhancement to the plastic and provide electronic or ionic conductivity. The conductive fillers useful in the embodiments of this disclosure have an elongated structure (i.e. they are not round or square) and is electrically conductive. Thus, the conductive filler will consist of particles (that is fibers, nanotubes or nano-platelets) having an aspect ratio that is greater than 1 (length/diameter for tubes and fibers, and length/thickness for platelets). Typically, they will have a high ratio; that is, the aspect ratio is at least 50, at least 100 (length/diameter ratio) but more typically is at least 200, 500 or, in some applications, at least 1000. As will be realized from this disclosure, discussions on the conductive filler being "having an aspect ratio" refers to the individual particles of the conductive filler having the aspect ratio, and discussion on the conductive filler being "aligned" refers to the individual particles of the conductive filler being aligned in relation to each other so that they extend lengthwise in the same direction. Exemplarily, conductive fillers include graphene nano-platelets, carbon nanotubes, carbon nanofibers, and other electrically conductive particles. Currently, conductive fibers selected from the group consisting of graphene nano-plateletes, carbon nanotubes, carbon nanofibers, or combinations thereof, are believed to be most useful, with graphene nano-platelets being currently preferred.

Graphene or a graphene nano-platelet is a 2-dimensional one atom thick layer of carbon atoms. Graphene consists essentially of a single layer of carbon atoms arranged in a hexagonal lattice. The graphene most useful herein are ones with an aspect ratio of greater than 1 as more extensively discussed above.

The present embodiments rely on the discovery that by applying voltage to the SPE and conductive-filler mixture during curing, the conductive filler can be aligned so as to have directional ionic conductivity; that is, conductivity is favored in one direction over others. Typically, the SPE and conductive filler will be added to an epoxy resin and it is the curing of the epoxy resin during application of voltage that locks the individual particles (nanofibers, nano-platelets and/or nanotubes) into alignment. Thus, the resulting composition is an epoxy solid-polymer electrolyte (epoxy-SPE) having conductive filler aligned to have directional ionic conductivity.

The epoxy resin employed can be any suitable epoxy which will serve to impart the applicable structural characteristics for the application/use of the epoxy-SPE. Currently, preferred are the epoxy resin is an amine-cured epoxy resin. For example, amine-cured diglycidylether of bisphenol-F (DGEBF) epoxy resin is suitable amine cured epoxy resins. While an amine cured DEEBF epoxy resin is used to demonstrate the procedure, the method can be used with other thermosetting or non-thermosetting polymers such as diglycidylether of bisphenol-A (DGEBA) epoxy resins, vinyl esters, or unsaturated polyesters cured by in situ polymerization, thermoplastic polymers that are thermally processed and don't necessarily have to go through a polymerization process, thermoplastic polymers that are generated from monomers such as poly(methyl methacrylate), and any other polymer material that is adaptable to disperse the conductive filler. The polymer serves as a structure to hold the dispersed and aligned conductive filler and the broad embodiment of the method is not limited to the use of a specific polymer. The method could also be used with other non-polymer liquid processed materials, such as pre-cursor derived ceramics, that can be used to hold an aligned dispersion of conductive filler.

Generally, the epoxy-SPE will contain a ratio of SPE to epoxy resin of from 10:100 to 60:100. Further, the metal salt will be present in an amount from 0.05% wt to 0.25% wt based on the total amount of base polymer of the SPE. The conductive filler is present in any suitable amount to achieve the desired structural and conductivity properties. For example, the conductive filler can be present in any amount that can be suitably dispersed. For example, the conductive filler can be present in amounts up to 5 wt % based on the total amount of base polymer of the SPE, but higher amounts can be used depending on the dispersion technique utilized.

In some embodiments, the conductive filler is present in an amount from 0.2 wt % to 0.5 wt % based on the total amount of base polymer of the SPE.

In accordance with the above, a process for making a polymer-filler composition can first require introducing conductive filler and epoxy resin into a liquid comprising a base polymer and metal salt so as to produce a mixture. Voltage is then applied to the mixture so as to align the conductive filler within the mixture and the epoxy resin is cured. The curing can be concurrently with the alignment, or after alignment has occurred but while voltage is still being applied. The epoxy resin is cured so that the mixture produces an epoxy-SPE having the conductive filler aligned to have directional ionic conductivity.

In accordance with embodiments of this disclosure, structural supercapacitors have been developed, using carbon fiber as electrodes and solid polymer electrolytes, with high multifunctionality using the novel technique of conductive filler alignment. The supercapacitor is a unique kind of electric storage device that sits on the sweet spot between capacitors (high power density) and rechargeable batteries (high energy density).

In the simplest form, a multifunctional structural composite can be fabricated by combining two layers of carbon fiber plies surrounding two layers of solid-polymer electrolyte and separated by a separator. This constitutes the fundamental principle of a structural-supercapacitor.

More specifically and with reference to FIG. 1, a structural supercapacitor can comprise one or more plies 10, as illustrated in FIG. 1. Each ply 10 comprises a first conducting member 12, a second conducting member 14, a first epoxy-SPE layer 16, a second epoxy-SPE layer 18 and an insulating mat 20.

First conducting member 12 and second conducting member 14 can be composed of a conducting material such as carbon fiber, metallic wires, metallic mesh, or combinations thereof. For example, the conducting members can be composed of carbon fiber. Each conducting member has a plurality of planar aligned conductive filler oriented normal to its surface such that the particles of the filler extend into one of the epoxy-SPE layers. For example, nano-platelets can be deposited onto the surface of the conducting member by electrophoretic deposition. With reference to FIG. 1, the conductive filler is hereinafter referred to as graphene nano-platelets; however, the discussion is applicable to other conductive fillers.

Thus, as illustrated in FIG. 1, first conducting member 12 has a first inner surface 22 with planar aligned graphene nano-platelets 24 oriented normal to first inner surface 22. Similarly, second conducting member 14 has a second inner surface 26 with planar aligned graphene nano-platelets 28 oriented normal to second inner surface 26.

As further seen from FIG. 1, aligned graphene nano-platelets 24 extend out from first inner surface 22 at a first plurality of sections 30. This first plurality of sections 30 alternate with a second plurality of sections 32, which do not have graphene nano-platelets. Similarly, aligned graphene nano-platelets 28 extend out from second inner surface 26 at a first plurality of sections 34. This first plurality of sections 34 alternate with a second plurality of sections 36, which do not have graphene nano-platelets. In this manner, alternating bands of ionic sections (graphene nano-platelet sections) and mechanical connection sections (non-graphene nano-platelet sections). The mechanical connection sections serving to provide areas for bonding to epoxy-SPE or other material. While illustrated in this alternating section manner, the present disclosure is not limited to such a structure and includes embodiments without the alternating second sections.

If alternating sections are used, they can be produced by various lithography techniques, such as, masking the conducting member to create alternating sections with and without masking. The conducting member then undergoes electrophoretic deposition (EPD) to deposit the graphene nano-platelets on the non-masked sections, thus producing the ionic bands or sections. This is followed by planar alignment of the graphene nano-platelets normal to the conducting member surface by utilizing an electric field and applying a bias to the conducting member. While not wishing to be bound by theory, such an aligned graphene nano-platelet structure is expected to increase the ionic contact surface area by a thousand-fold. The mechanical connection band of the conducting material can be cleared by chemically removing the masking to thus produce the non-graphene nano-platelet sections. These surfaces will then be available for direct bonding with the epoxy resin for mechanical load transfer.

Sandwiched between first inner surface 22 of first conducting member 12 and second inner surface 26 of second conducting member 14 are a pair of epoxy-SPE layers: first epoxy-SPE layer 16 and second epoxy-SPE layer 18. The pair of epoxy-SPE layers are in accordance with this disclosure and comprise an epoxy resin, a solid polymer electrolyte (SPE), and graphene nano-platelets aligned to have directional ionic conductivity.

Sandwiched between the pair of epoxy-SPE layers is insulating mat 20. Insulating mat 20 is sufficient to prevent electrical conducting between first epoxy-SPE layer 16 and second epoxy-SPE layer 18 so as to establish capacitance. For example, insulating mat 20 can be a glass fiber-mat. The insulating layer can be other materials such as ceramic fiber-mat, ceramic membranes, insulating polymer membranes, glass membranes, etc. The only requirement is appropriate insulating properties and ability to be incorporated into the epoxy-SPE layers.

The ply 10 can be made in accordance with the above process for making a polymer-graphene composition. That is, first graphene and epoxy resin are introduced into a liquid comprising a base polymer and metal salt so as to produce a mixture.

The mixture is then cured as the two epoxy-SPE layers, by techniques readily known in the art, so as to form a first epoxy-SPE layer on a first layer on one side of the insulating mat and a second epoxy-SPE layer on the second side of the insulating mat, and so that the two epoxy-SPE layers and the insulating mat are sandwiched between the first and second conducting members. The difference being that the consolidation of the ply will be while voltage is applied so as to align the graphene within the mixture. Usually the materials will be composited under a substantial applied pressure as well; for example, a pressure within the range of 15-250 psi.

As will be realized, the consolidation is done so as that the planar aligned graphene nano-platelets 24 on the first inner surface 22 extend into the first epoxy-SPE layer 16, and the planar aligned graphene nano-platelets 28 on the second inner surface 26 extend into the second epoxy-SPE layer 18.

EXAMPLES

The following examples illustrate specific embodiments consistent with the present disclosure but do not limit the scope of the disclosure or the appended claims. Concentrations and percentages are by weight unless otherwise indicated.

Example 1

The synthesis and characterization of a solid polymer electrolyte (SPE) system were done using different variations of structural (amine-cured epoxy resin) and ionic (PEG/LiTf) components. Additionally, graphene nano-platelets were incorporated and aligned in the SPE system.

Synthesis of SPE was carried out by adding varying amounts of polyethylene glycol (PEG), lithium triuoromehtanesulfonate (LiTf), and graphene nano-platelets into an amine-cured diglycidylether of bisphenol-F (DGEBF) epoxy resin. The amount of PEG epoxy was kept constant for all the material systems at a ratio of 30:100 by weight. The criteria governing the selection of PEG is the presence of long chains of etheric oxygen (EO) that provide long-range transport of lithium ion which results in high conductivity. To fabricate these materials, first the PEG and LiTf were mechanically mixed and ultra-sonicated until a homogeneous liquid was obtained. Two ratios of PEG to LiTf were used, namely 0.1 and 0.2 by weight.

The epoxy resin and graphene nano-platelets (at various weight fractions) were added to the PEG-LiTf mixture. The weight fraction of graphene nano-platelets was varied in the range of 0.0-0.5% by weight with respect to base polymer of the SPE. The nano-platelets were aligned by applying AC voltage at an intensity of 3.0-10.0 volts/mm. A wideband amplifier was used to generate the base voltage, and an AC signal generator was used to modulate the signal at a frequency of 10 kHz. Durations needed to align graphene nano-platelets are around 30-120 minutes. Table 1 illustrates various compositions evaluated.

TABLE 1

| Sample | LiTf/PEG ratio | Graphene wt. % based on base polymer in the SPE | Alignment |
|---|---|---|---|
| S1 | 0.1 | 0 | No |
| S2 | 0.2 | 0 | No |
| S3 | 0.2 | 0.25 | No |
| S4 | 0.2 | 0.5 | No |
| S5 | 0.2 | 0.25 | Yes |
| S6 | 0.2 | 0.5 | Yes |

X-ray diffraction was performed to confirm the alignment of graphene nano-platelets within the electrolytes using CuKα radiation apparatus (Bruker AXS D8-Discover) at 40 kV. The X-ray diffraction (XRD) data were recorded in the range of 2θ angles between 10 and 70 degrees. The identification of the degree of crystallization was determined using the diffraction spectrum. FIG. 2 illustrates the resulting X-ray diffraction data.

FIG. 2 shows a broad hump between 20 to 30 degrees, which illustrates the presence of graphene nano-platelets. The sharp peak around 22 degrees observed for the case of "aligned graphene" indicates that the nano-platelets were successfully aligned in the direction of the applied voltage.

The ionic conductivity of various samples was tested using electrochemical impedance spectroscopy using an amplitude of 5 mV and in the frequency range of 1 Hz to 1 MHz. The ionic conductivity of the sample was calculated from resulting bulk resistance (Rb), as $\square=1/(Rb \times A)$, where, 1 is the sample thickness, and A is the cross-sectional area. FIG. 3 illustrates the ionic conductivity for each sample.

FIG. 3 demonstrates that the ionic conductivity is higher with increasing LiTf/PEG ratio. It is well understood that ionic conductivity is affected significantly by charge carrier concentration of the system, which in this case is LiTf. It is also observed that there was no substantial change in ionic conductivity with (non-aligned) graphene inclusion. However, alignment of graphene nano-platelets leads to a 150% increase in the ionic conductivity as compared to the non-graphene electrolyte. While not wishing to be bound by theory, it is believed this is a directional increase in ionic conductivity and is due to contact or tunneling effect of conductive graphene nano-platelets.

A dynamic analysis was conducted to examine the effect of PEG content and graphene nano-platelet on the mechanical properties of the SPE-epoxy system. The storage modulus was determined for each sample. FIG. 4 illustrates that inclusion of PEG reduces the storage modulus of the epoxy resin (modulus of 3000 MPa at room temperature for neat epoxy resin). This effect is quite deleterious. For example, the inclusion of 30 wt.\% of PEG reduces the room-temperature storage modulus of epoxy by 60%. This reduction is because the long chain of PEG obstructs the cross-linking process for the epoxy resin. FIG. 3 also shows that the addition of graphene, specifically aligned nano-platelets, can significantly offset this reduction in storage modulus. The inclusion of 0.5 wt. % of aligned graphene nano-platelets leads to a 170% increase in the storage modulus as compared to epoxy that contains only PEG. In fact, the storage modulus is found to be higher than even the neat epoxy resin. Furthermore, this increase in mechanical properties comes with a simultaneous increase in electrical conductivity.

Similar conclusions can be drawn from measurements of the glass transition temperature of the electrolyte. FIG. 5 plots the glass transition temperature, Tg, determined by the tan peak for the various materials investigated. As observed before, the inclusion of PEG content in the epoxy resin reduces the Tg. This is because the longer flexible chains of PEG increase molecular network flexibility. The inclusion of graphene nano-platelets, however, increases the glass transition temperature. It is currently believed that this is because the stiffer graphene nano-platelets hinder the flexibility of the polymer chain. Again, the highest values of Tg are observed for the materials containing aligned graphene nano-platelets.

Finally, FIG. 6 shows the "multi-functionality map" of the six different variants of solid polymer electrolytes in comparison with the neat epoxy resin. This map illustrates the effectiveness of adding and aligning graphene nano-platelets in the SPE system. It also shows that an increase in ionic conductivity can occur with a simultaneous increase in mechanical properties by appropriate material modification (such as the use of aligned graphene nano-platelets).

The above illustrates that a distribution of aligned graphene nano-platelets promotes electronic conduction. While not wishing to be bound by theory, it is believed that this is either due to contact or tunneling of electrons through the percolation network. Unlike increasing the PEG/LiTf content, the inclusion of graphene nano-platelets enhances rather than degrades the mechanical properties of the SPE system. Furthermore, the alignment of graphene leads to directionally enhanced ionic conductivity and reduces the total amount of graphene needed to obtain desired electrical characteristics.

Therefore, the present compositions and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, where "about" has been used it will generally mean plus or minus half a significant figure unless the usage indicates otherwise. Finally, the terms in the claims have their plain, ordinary meaning unless otherwise explicitly and clearly defined by the patentee.

What is claimed is:

1. A structural supercapacitor comprising one or more plies, with each of the plies having:
   a first conducting member having a first inner surface with a first plurality of sections of the first inner surface, wherein each of the first plurality of sections has planar aligned conductive filler oriented normal to the first inner surface of the first conducting member, wherein conductive filler is an elongated particle which is electrically conductive;
   a second conducting member having a second inner surface with a first plurality of sections of the second inner surface, wherein each of the first plurality of sections has planar aligned conductive filler oriented normal to the second inner surface of the second conducting member;
   a pair of epoxy-SPE layers between the first inner surface of the first conducting member and the second conducting member, wherein the epoxy-SPE layers comprise:
   an epoxy resin;
   a solid polymer electrolyte (SPE);
   conductive filler aligned to have directional ionic conductivity; and
   an insulating mat positioned between the epoxy-SPE layers.

2. The structural supercapacitor of claim 1, wherein the first conducting member and second conducting member comprise one or more of carbon fiber, metallic wires or metallic meshes.

3. The structural supercapacitor of claim 2, wherein:
   the first plurality of sections of the first inner surface alternate with a second plurality of sections of the first inner surface, wherein the second plurality of sections do not have conductive filler; and
   the first plurality of sections of the second inner surface alternate with a second plurality of sections of the second inner surface, wherein the second plurality of sections do not have conductive filler.

4. The structural supercapacitor of claim 1, wherein the conductive filler is one or more of graphene nano-platelets, carbon nanotubes or carbon nanofibers.

5. The structural supercapacitor of claim 1, wherein the SPE comprises a base polymer and a metal salt.

6. The structural supercapacitor of claim 5, wherein the epoxy-SPE layers contain a ratio of SPE to epoxy resin of from 10:100 to 60:100, a ratio of metal salt to base polymer of from 0.05% to 0.25% by weight and the graphene is present in an amount up to 5% by weight based on the weight of the base polymer.

7. The structural supercapacitor of claim 4, wherein the base polymer is a polyether and the metal salt is a salt of lithium.

8. The structural supercapacitor of claim 7, wherein the first conducting member and second conducting member are carbon fibers.

9. The structural supercapacitor of claim 8, wherein the base polymer is a polyethylene glycol, the metal salt is a salt of lithium, and the epoxy resin is an amine-cured epoxy resin.

10. The structural supercapacitor of claim 9, wherein the epoxy-SPE layers contain a ratio of SPE to epoxy resin of from 10:100 to 60:100, a ratio of metal salt to base polymer of from 0.05 to 0.25 by weight and the graphene is present in the range of 0.2% to 0.5% by weight based on the weight of base polymer.

11. The structural supercapacitor of claim 10, wherein the conductive filler is graphene nano-platelets.

12. The structural supercapacitor of claim 11, wherein:
   the first plurality of sections of the first inner surface alternate with a second plurality of sections of the first inner surface, wherein the second plurality of sections do not have graphene nano-platelets; and
   the first plurality of sections of the second inner surface alternate with a second plurality of sections of the second inner surface, wherein the second plurality of sections do not have graphene nano-platelets.

13. A composition comprising:
   a pair of epoxy-SPE layers, wherein the epoxy-SPE layers comprise:
   an epoxy resin;
   a solid polymer electrolyte (SPE); and
   conductive filler aligned to have directional ionic conductivity; and
   an insulating mat positioned between the epoxy-SPE layers.

14. The composition of claim 13, wherein the conductive filler is one or more of graphene nano-platelets, carbon nanotubes or carbon nanofibers.

15. The composition of claim 13, wherein the SPE comprises a base polymer and a metal salt.

16. The composition of claim 15, wherein the base polymer is a polyether and the metal salt is a salt of lithium.

17. The composition of claim 15, further comprising:
   a first conducting member, and
   a second conducting member, and
   wherein the pair of epoxy-SPE layers are positioned between the first conducting member and the second conducting member.

18. A composition comprising,
   an epoxy resin;

a solid polymer electrolyte (SPE) comprised of a base polymer and a metal salt; and conductive filler aligned to have directional iconic conductivity; and wherein the base polymer is a polyethylene glycol, the metal salt is a salt of lithium, and the epoxy resin is an amine-cured epoxy resin.

\* \* \* \* \*